US009155017B2

(12) United States Patent
Prabhu (10) Patent No.: US 9,155,017 B2
(45) Date of Patent: Oct. 6, 2015

(54) ACCESS POINT DETECTION FOR WIRELESS NETWORKING

(75) Inventor: Krishnanand Prabhu, Bangalore (IN)

(73) Assignee: KYOCERA Corporation, Kyoto (JP)

( * ) Notice: Subject to any disclaimer, the term of this patent is extended or adjusted under 35 U.S.C. 154(b) by 1806 days.

(21) Appl. No.: 12/364,975

(22) Filed: Feb. 3, 2009

(65) Prior Publication Data

US 2010/0195632 A1     Aug. 5, 2010

(51) Int. Cl.
*H04W 4/00* (2009.01)
*H04W 36/32* (2009.01)
*H04W 4/02* (2009.01)
*H04W 48/20* (2009.01)

(52) U.S. Cl.
CPC ........... *H04W 36/32* (2013.01); *H04W 4/02* (2013.01); *H04W 48/20* (2013.01)

(58) Field of Classification Search
CPC ........ H04W 36/32; H04W 4/02; H04W 48/20
USPC ......................................................... 370/338
See application file for complete search history.

(56) References Cited

U.S. PATENT DOCUMENTS

| 2005/0130658 A1* | 6/2005 | Stephens | 455/436 |
| 2005/0238047 A1* | 10/2005 | Holland et al. | 370/465 |
| 2006/0030350 A1* | 2/2006 | Mitchell | 455/522 |
| 2008/0069065 A1* | 3/2008 | Wu et al. | 370/340 |
| 2008/0281952 A1* | 11/2008 | Fedotenko | 709/223 |
| 2009/0061892 A1* | 3/2009 | Lee et al. | 455/456.1 |

OTHER PUBLICATIONS

MEXENS LLC., Navizon Peer-to-Peer Wireless Positioning, http://www.navizon.com/FullFeatures.asp, The Navizon Wireless Positioning System, last accessed on Jun. 17, 2008 at the above mentioned web page address.

* cited by examiner

*Primary Examiner* — Mang Yeung (57) ABSTRACT

Methods and systems for detecting one or more access points in a wireless network are disclosed. The location coordinates of a wireless communication device (WCD) are first determined. Based on comparisons made with the WCD location coordinates, if the WCD is within range of a wireless local area network (WLAN) access point and remains stationary for a preset time interval, a wireless local area network (WLAN) radio interface may be activated within the WCD to connect to the WLAN via the access point.

19 Claims, 6 Drawing Sheets

ACCESS POINT DETECTION FOR WIRELESS NETWORKING

TECHNICAL FIELD

The present disclosure generally relates to wireless communications, and more particularly, to wirelessly accessing computer networks.

BACKGROUND

Wireless local area networks (WLANs), such as Wireless Fidelity (Wi-Fi) networks, have become increasingly popular in recent years. Wi-Fi networks operate according to the Institute of Electrical and Electronic Engineers (IEEE) 802.11 standard (e.g., IEEE-802.11 a/b/g/n). Industry standard Wi-Fi networks have a relatively short range: typically, an indoor range of about 100-300 feet and an outdoor range of approximately 1000 feet. The strength and performance of a Wi-Fi network radio signal typically degrades as the distance increases, and also depends on a number of factors, such as atmospheric conditions and physical obstructions.

To provide distributed wireless access to a network, network service providers often provide geographically-dispersed wireless access points. Wireless access points are network components that include radio interfaces which allow users to wirelessly access a local area computer network via portable, Wi-Fi enabled, wireless communication devices (WCDs), such as certain laptops, personal digital assistants (PDAs), smart phones, cellular phones, and the like. Wi-Fi access points provide coverage areas that are referred to as "hotspots" and are currently located in many airports, hotels, restaurants, libraries, town centers, coffee shops and convention centers, for example.

Particularly, the term hotspot refers to the area extending from the wireless access point within which Wi-Fi radio signals are broadcasted and can be detected by Wi-Fi enabled WCDs. Each working wireless access point thus emits a wireless signal recognized by the Wi-Fi enabled WCDs. Upon successfully detecting the wireless signals, the WCDs may connect to and access the Wi-Fi network via a series of authentication and connection procedures with the Wi-Fi network.

At a WCD, the availability of a nearby Wi-Fi access point is typically detected in one of two ways: 1) by constantly keeping the WCD's Wi-Fi radio on so that the hotspot is detected when the WCD moves within range of the access point; or 2) by intermittently turning on the WCD's Wi-Fi radio to periodically scan for access points within range. It is also known to provide lists of available access points in particular geographic locations, in response to user requests received through a computer network.

Although useful in some circumstances, the above-mentioned techniques for detecting Wi-Fi access points present serious operational limitations in many situations.

SUMMARY

Disclosed herein are improved techniques for detecting WLAN access points. A problem with known WLAN access point detection methods is that they often waste WCD battery power. Many WCDs are battery powered and such power is a limited resource. The known detection methods that require activation of Wi-Fi radios in WCDs often waste battery power, especially in areas where there are no Wi-Fi access points available.

A method is described for detecting one or more access points in a wireless network. The method includes determining the location coordinates of a wireless communication device (WCD). Based on comparisons made with the WCD location coordinates, if the WCD is within range of a WLAN access point and remains stationary for a preset time interval, a WLAN radio interface may be activated within the WCD to connect to the access point.

Another method is described for detecting one or more access points in a wireless network. This method includes determining location coordinates of a WCD, transmitting the location coordinates though a wireless wide area network (WWAN) to a service provider, the service provider determining whether one or more access points of a WLAN are within the vicinity of the WCD by comparing the location coordinates to a database of access point location coordinates, determining whether the WCD remains within a predetermined area during a predetermined interval based on the location coordinates, transmitting to the WCD a list of one or more access points within the vicinity of the WCD, activating a WLAN interface in the WCD based on whether the WCD remains within a predetermined area during a predetermined interval, and scanning for the access points with the WLAN interface when the WLAN interface is activated.

A system is described that includes a module configured to determine location coordinates of a WCD, a processor and a radio interface. The processor is configured to compare the location coordinates to a database of access point location coordinates and to determine whether the WCD remains within a predetermined area during a predetermined interval based on the location coordinates. The radio interface, included in the WCD, detects a WLAN access point based on the comparison of the location coordinates to the database and based on whether the WCD remains within the predetermined area during the predetermined interval.

Other aspects, features, advantages of the foregoing system and methods will be or will become apparent to one with skill in the art upon examination of the following figures and detailed description. It is intended that all such additional aspects, features, and advantages be included within this description and be protected by the accompanying claims.

BRIEF DESCRIPTION OF THE DRAWINGS

It is to be understood that the drawings are solely for purpose of illustration and do not define the limits of the invention. Furthermore, the components in the figures are not necessarily to scale. In the figures, like reference numerals designate corresponding parts throughout the different views.

DETAILED DESCRIPTION

The following detailed description, which references to and incorporates the drawings, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

The word "exemplary" is used throughout this disclosure to mean "serving as an example, instance, or illustration." Anything described herein as "exemplary" is not necessarily to be construed as preferred or advantageous over other approaches or features.

Figure 1:
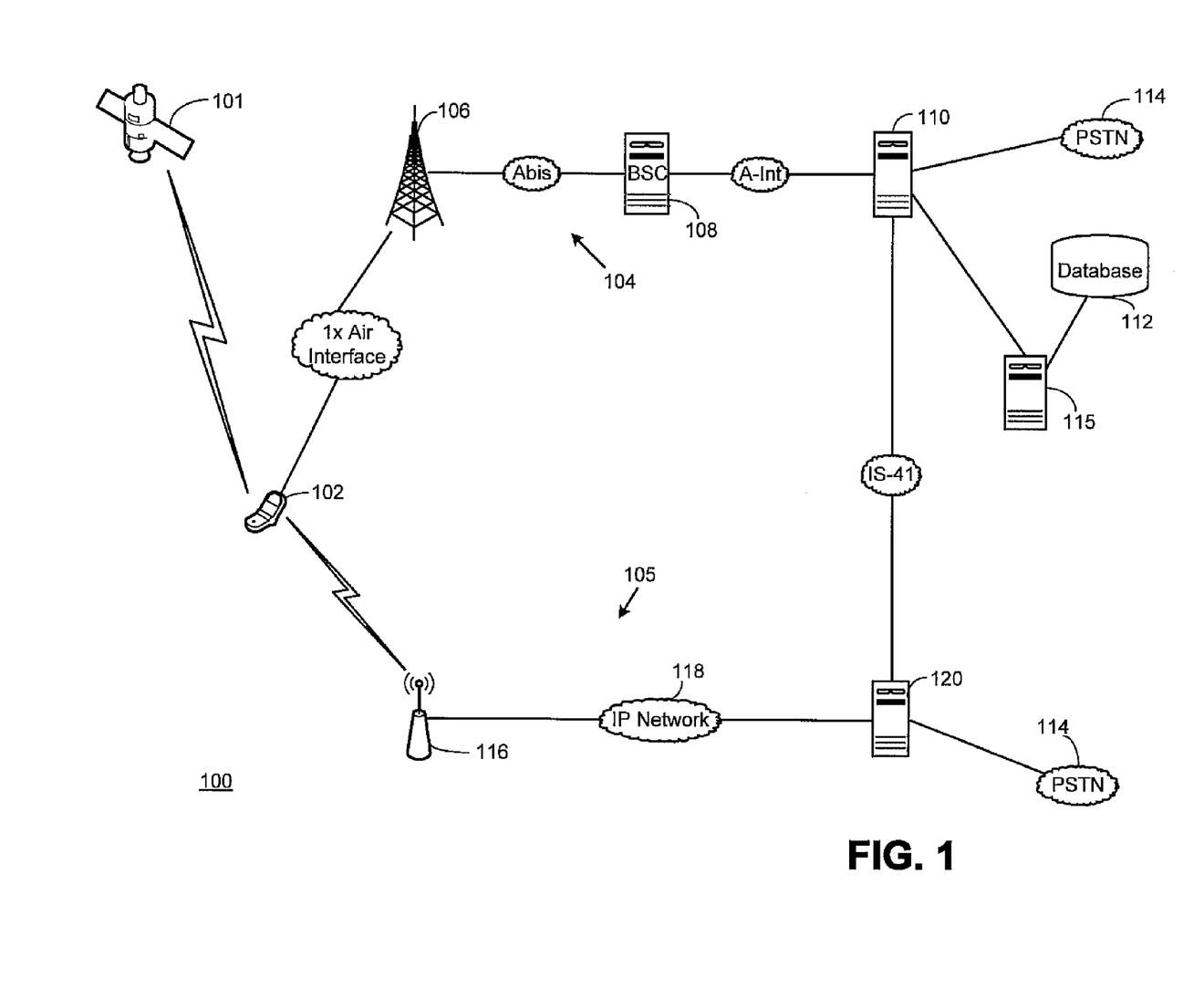
FIG. 1 illustrates an exemplary communication system including a GPS-enabled, dual-mode wireless communication device (WCD).

FIG. 1 illustrates an exemplary communication system 100 including one or more GPS-enabled, multi-mode wireless communication devices (WCDs) 102 capable of communicating over a wireless wide area network (WWAN) 104 and a wireless local area network (WLAN) 105. The WCD 102 is configured to receive and process GPS (Global Positioning System) signals from a GPS satellite system 101.

The communication system 100 is configured to update a user carrying a GPS-enabled WCD about the nearest available WLAN access points, so that the user can navigate to the nearest desired access point and connect to WLAN service. This configuration provides at least the following benefits over the known methods of finding WLAN access points: 1) the WCD's WLAN radio interface need not always be kept on, which prevents wasting valuable WCD battery power, especially in areas where there are no WLAN access points available; 2) the WCD's WLAN radio interface need not be intermittently switched on and off every few minutes as per some algorithms, as this too may waste considerable battery power; 3) the WCD user need not manually request and scan for access points, thus increasing the convenience of the WCD; and 4) the service provider can benefit by levying a charge on WCD users for automatically providing lists of available WLAN access points.

Turning now to FIG. 1, the multi-mode WCD 102 integrates the capabilities of a conventional wide-area cellular network (e.g., CDMA, GSM, UMTS, TDMA, and the like) and other types of networks, such as WLANs. Thus, the multi-mode WCD 102 includes interfaces for communicating with more than one wireless network. Another term used to refer to multi-mode devices is "dual-mode device". The term dual-mode device refers generally to a user device that is capable of communicating with two different wireless networks, and it is frequently used synonymously with the term multi-mode terminal device. Wireless multi-mode terminal devices represent a significant advance in wireless communications because they allow a single device to conveniently access services available on different networks.

The WCD 102 includes a Global Positioning System (GPS) function. The GPS function provides positional information, related to the location of the GPS device, by receiving and processing GPS band signals from the GPS satellite system 101. The GPS function may be provided by a commercially-available GPS module that is integrated into the electronics included in the WCD 102.

The WCD 102 may be any suitable type of wireless terminal device, such as a mobile cellular phone, personal digital assistant (PDA), cordless phone, gaming device, or the like, that is configurable to function as described herein and capable of communicating with both the WWAN 104 and WLAN 105 over respective wireless links. The WCD 102 is preferably a Wi-Fi-CDMA dual mode mobile phone equipped with GPS.

The WWAN 104 may be a cellular network such as a CDMA, WCDMA, GSM/GPRS, UTMS, AMPS, PHS network or the like, operated by a primary access network provider. The WWAN 104 includes infrastructure comprising those network elements necessary to support wireless voice and/or data communications with the WCD 102. The wireless communication infrastructure includes equipment such as controllers, transceivers and backhaul that establishes and maintains wireless communication with the WCD 102, as well as other terminal devices. The types and numbers of devices within the wireless infrastructures depend on the particular wireless network.

In the exemplary communication system 100 the WWAN 104 is a GSM/GPRS network. In the example, the WWAN 104 cellular network includes sector antennas connected to at least one base transceiver station (BTS) 106, connected to a base station controller (BSC) 108, that is connected to a mobile switching center (MSC)/visitor location register (VLR) 110. The WCD 102 communicates with the GSM/GPRS network via a conventional 1× Air Interface. A conventional Abis interface is used between the BTS 106 and the BSC 108. Generally, the Abis interface may be implemented by a DS-1, ES-1, or E1 TDM circuit. The Abis interfaces TDM subchannels for traffic (TCH), LAPD protocol for BTS supervision and telecom signaling, and carries synchronization from the BSC 108 to the BTS 106 and MSC 110. A conventional A interface is used between the BSC 108 and MSC 110. It is used for carrying Traffic channels and the BSSAP user part of the SS7 stack.

The BSC 108 is capable of communicating with an IP-based network, such as the Internet, via the MSC 110 and a network convergence gateway (NCG) 102. The base stations are also capable of communicating with the public switched telephone network (PSTN) 114 via the MSC 110. Thus, conventional cellular base stations included in the WWAN 104 use the MSC 110 to provide conventional voice connections and telephony services between the WCD 102 and other telephone devices, such as conventional landline phones (not shown).

The WLAN 105 is preferably a packet-based network, such as a Wi-Fi network (e.g., IEEE-802.11a/b/g/n), that supports voice-over-IP (VOIP) service and data services over the Wi-Fi connections. The WLAN 105 includes those network elements, such as one or more Wi-Fi access points 116, necessary to support data and voice communications with the WCD 102. With a Wi-Fi 802.11x network, the WCD 102 can connect to the NCG 120 using ad hoc connections that are available on 802.11x networks.

The WLAN 105 communications with the NCG 120 by way of an Internet Protocol (IP) network 118, such as the Internet.

The NCG 120 is a carrier-based, core network, fixed mobile convergence (FMC) server that bridges the WLAN 105 and WWAN 104. The NCG 120 is configured to bridge session initiation protocol (SIP) and SS7 signaling networks (i.e., the WLAN 105 and WWAN 104, respectively), acting as a SIP register/proxy/server to WLAN 105. Using the NCG 120, a network bridge is formed between the WWAN's SS7 signaling and the SIP signaling of the WLAN 105. The NCG 120 may be implemented using a commercially-available gateway, such as one from CounterPath Corporation.

A centralized, smart access network switching server (ANSS) 115 is located in the MSC 110 of the WWAN 104. The ANSS 115 maintains a database 112 of available registered Wi-Fi access points 116 in and around the MSC 110, along with their fixed location coordinates, such as GPS location coordinates. The database 112 can include information regarding registered Wi-Fi access points in a particular geographic area, such as an entire city.

Since the GPS location coordinates of a Wi-Fi access point are typically fixed, the entity (e.g., a corporate or individual) maintaining that particular access point, registers its location coordinates manually by sending a communication to the primary access network provider operating the WWAN 104, who in turn updates the database 112 via the ANSS 115.

Once the user of the WCD 102 has acquired WWAN service, he/she registers once with the ANSS 115 located in the MSC 110 of the primary access network provider in order to detect and switch to, if available, nearby Wi-Fi access points. The WCD 102 can be programmed so that the registration is performed automatically by the WCD 102 and happens in background without the knowledge of the user. Once the user registration is done, the user's GPS location coordinates are periodically transmitted to the ANSS 115 every few milliseconds/seconds. This transmission of location coordinates may be programmed to happen automatically in the background, without further action by the WCD user.

The ANSS 115 compares the incoming location coordinates of the WCD user, which may change over time, with the location coordinates of the registered Wi-Fi Access points in its database 112, which remain static. Once a match is found and if the ANSS 115 continues to receive the same or approximately the same location coordinates from the user over a preset time period, the ANSS 115 understands that the user's location is stationary.

If the user's location is stationary, the ANSS 115 sends to the WCD 102 a list of Wi-Fi access points available in the user's vicinity, through the WWAN 104. The WCD 102 may be configured, for example, using software, to automatically switch on its Wi-Fi radio interface, which has been turned off all this while, to start scanning for access points. Once it finds a nearby access point with the strongest signal, the WCD 102 switches from the WWAN 104 to the WLAN 105 by connecting to the Wi-Fi access point 116. While the WCD 102 is connected to the WLAN 105, it temporarily stops sending its location coordinates to the ANSS 115.

The ANSS 115 is configured to observe the location of the WCD 102 for a preset interval, before sending the location coordinates of the Wi-Fi Access points in proximity to that location. This is especially useful when the WCD 102, being mobile, keeps changing its location. It ensures that when a mobile user enters an area, where Wi-Fi access points are available and stays in that area for a preset interval, only then is a switch attempted from the WWAN 104 to the WLAN 105.

A user alert, such as a single tone audible beep, can be played on the WCD 102 through a user interface when the WCD 102 receives the list of Wi-Fi access points, indicating that an access point is nearby and that the WCD 102 will turn on its Wi-Fi radio interface and start scanning for access points.

Figure 2:
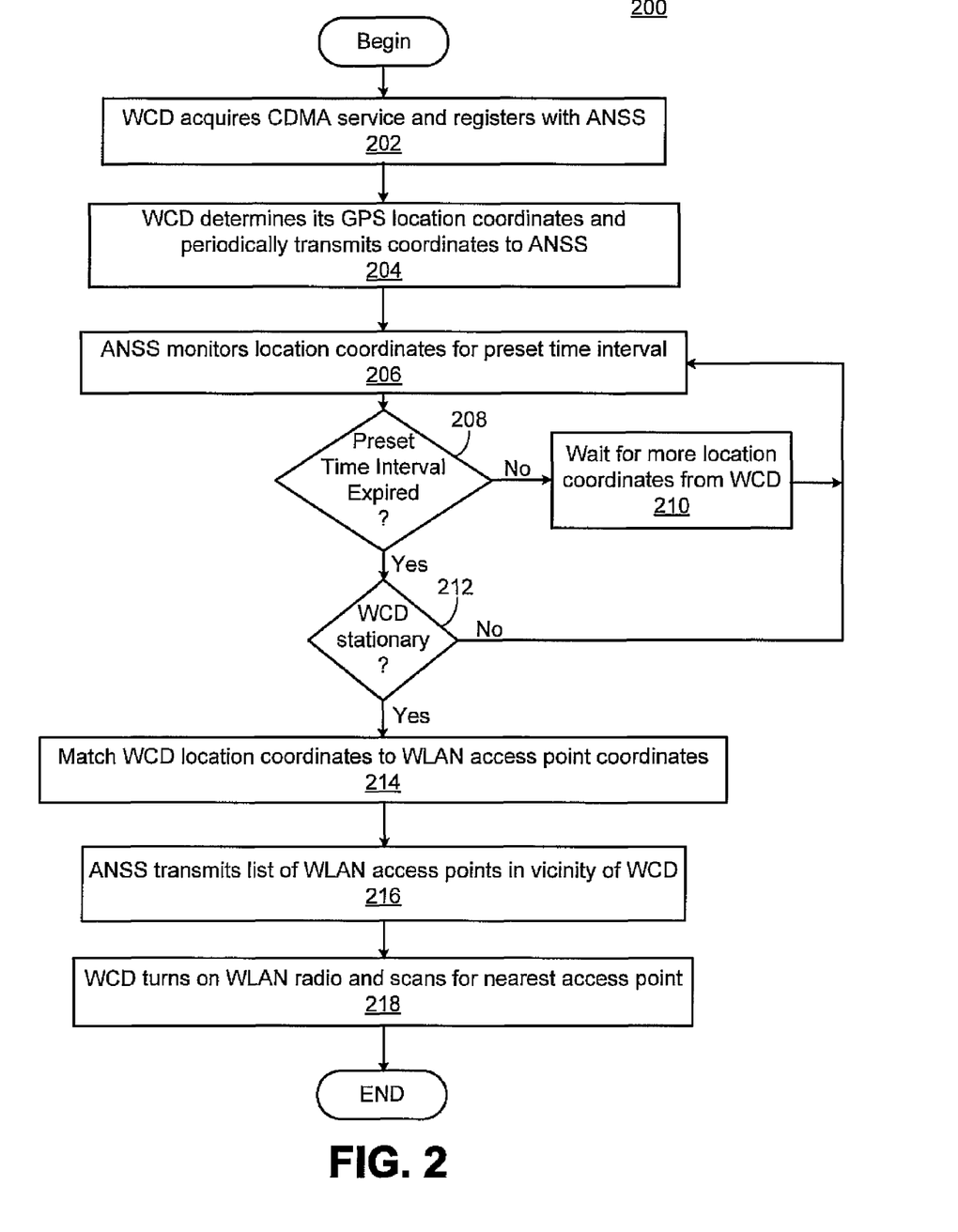
FIG. 2 is a flowchart illustrating an exemplary method of detecting wireless local area network (WLAN) access points.

FIG. 2 is a flowchart 200 illustrating an exemplary method of detecting WLAN access points. This method may be applied in the communication system 100 shown in FIG. 1.

In step 202, a WCD user acquires CDMA service through, for example the WWAN 104, and registers with the ANSS 115 in order to automatically detect available WLAN access points 116. The service acquisition and ANSS registration may be accomplished using conventional GSM/GPRS protocols and services. The registration of the WCD 102 with the ANSS 115 may include sending the WCD subscriber identity and/or related information to the ANSS 115.

Once this is done, the WCD 102 periodically determines its GPS location coordinates based on received GPS signals, and then transmits the GPS location coordinates to the ANSS 115 via the WWAN 104 (step 204). The GPS location coordinates can be transmitted to the ANSS 115 as data using suitable GSM/GPRS data communication protocols and procedures. The WCD 102 may compute and transmit its location coordinates at predefined intervals, for example, ranging from every few milliseconds to seconds.

In step 206, the ANSS 115 monitors the location coordinates obtained for a preset time interval. Generally, the ANSS monitoring interval includes plural GPS location coordinates, and is thus, longer than the predefined intervals at which GPS coordinates are calculated by the WCD 102. The preset monitoring interval can be any suitable time period, ranging from a fraction of a second to minutes. The monitoring step includes storing received GPS coordinates for later comparison operations.

In decision step 208, a check is made by the ANSS 115 to determine whether the preset monitoring time interval has expired. If the time interval has not expired, the ANSS 115 continues to wait and monitor incoming GPS location coordinates from the WCD 102 (step 210).

If the ANSS 115 determines that the monitoring time period has expired, it then determines whether the WCD 102 has remained stationary during the monitoring time period (step 212). Generally, the WCD 102 is considered to be stationary when it remains within the same area for the duration of the monitoring interval. This can be determined by the ANSS 115 computing differences or statistical variations between the location coordinates received from the WCD 102 during the monitoring interval. If the location coordinates do not change or change only slightly during a monitoring interval, the WCD 102 is determined to be stationary by the ANSS 115. In some circumstances, comparisons between location coordinates from different monitoring intervals can be made in order to determine whether the WCD 102 is stationary.

If the ANSS 115 determines that the WCD 102 is not stationary, the ANSS 115 starts a new monitoring interval and returns to step 206.

However, if the ANSS 115 determines that the WCD 102 is stationary, the ANSS 115 compares the WCD location coordinates to WLAN access point coordinates stored in the ANSS's database 112 to determine whether there is a match. The WCD location coordinates used in this comparison may be the average of the WCD location coordinates collected during the monitoring interval, or alternatively, it may be the most recently received set of location coordinates. A match is found if the WCD location coordinates indicate that the WCD is within a predetermined distance from a WLAN access point.

If one or more matching WLAN access points are found, the ANSS 115 sends information to the WCD 102 through the WWAN 104 regarding the available list of WLAN access points in the vicinity of the WCD location (step 216).

Upon receiving the list, the WCD software may automatically switch on the WCD's WLAN radio and start scanning for nearby access points (step 218). Once it finds the nearby access point with the strongest signal, the WCD 102 may connect to that WLAN access point. Once the WCD 102 is connected to the WLAN 105, it may temporarily stop sending its GPS location coordinates to the ANSS 115.

Figure 3:
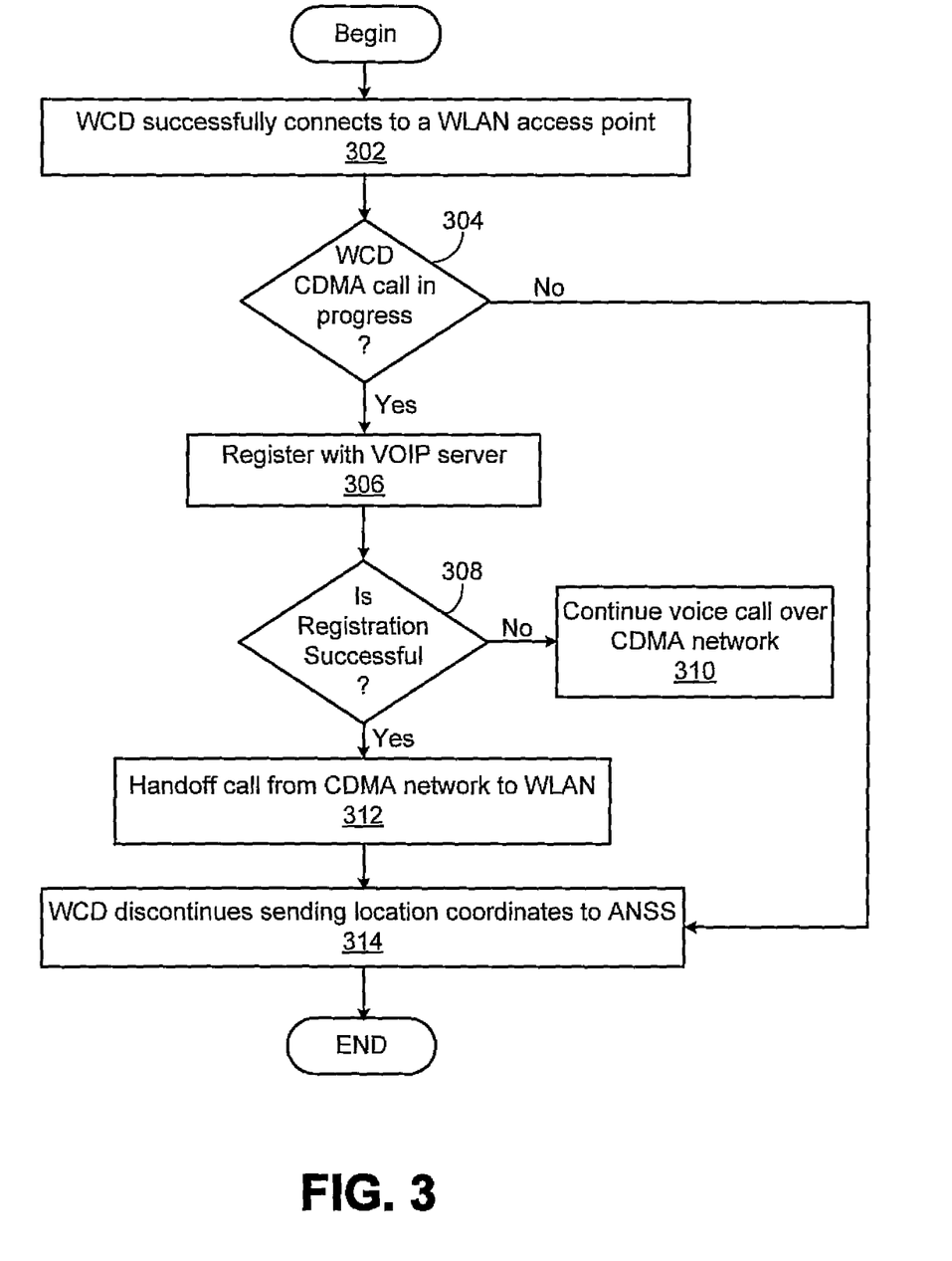
FIG. 3 is a flowchart illustrating an exemplary CDMA-to-WLAN handoff procedure.

FIG. 3 is a flowchart 300 illustrating an exemplary CDMA-to-WLAN handoff procedure. This procedure may be applied in the communication system 100 shown in FIG. 1. The GSM/GPRS WWAN 104 is a CDMA network.

In this scenario, the WWAN operator also has its own or a third-party voice over Internet Protocol (VOIP) server (not shown) integrated into the WWAN 104. The WCD 102 also includes a VOIP application that permits VOIP telephony. VOIP systems allow telephone calls to be place over TCP/IP networks, such as the Internet. The advantage of VOIP telephony is that VOIP phone calls are often substantially less expensive than calls placed using conventional telephone services. Unlike conventional telephone calls, which are typically placed from a telephone through a telephone network, VOIP calls are typically placed through the Internet. VOIP telephone handsets have been developed that closely resemble conventional telephones in appearance. However, instead of connecting to a conventional telephone network, these VOIP telephones connect to computers, such as personal computers (PCs) or servers, that are in turn connected to the Internet. Vonage and Skype are two examples of commercially-available VOIP services that allow users with computers or VOIP telephones to make voice telephone calls over the Internet.

In step 302, after the WCD 102 receives the list of WLAN access points from the ANSS 115, it connects to the nearest WLAN access point having the strongest signal.

In step 304, a determination is made whether the WCD 102 has a CDMA call in progress. If a CDMA call is not in progress, the WCD 102 nevertheless temporarily discontinues sending GPS location coordinates to the ANSS 115 while it is connected to the WLAN 105 (step 314).

If, however, the WCD user is in the middle of a COMA call when the WLAN connection occurs, the WCD 102 attempts to register with the VOIP server over the WLAN 105 (step 306). If the registration is successful (step 308) and if the call is successfully handed off to VOIP server via the WLAN 105 (step 312), then user continues his/her call over the WLAN 105 and the WCD 102 then temporarily discontinues sending its location coordinates to the ANSS (step 314) while connected to the WLAN 105. The WCD's WWAN radio may also be turned off after a successful handoff to the WLAN 105 to save power at the WCD 102.

On the other hand, if registration with the VOIP server is unsuccessful, the WCD 102 continues the call over the WWAN 104 (step 310) and disconnects from the WLAN access point. In this situation, the WCD 102 continues to send its location coordinates to the ANSS 115 via the WWAN 104.

Figure 4:
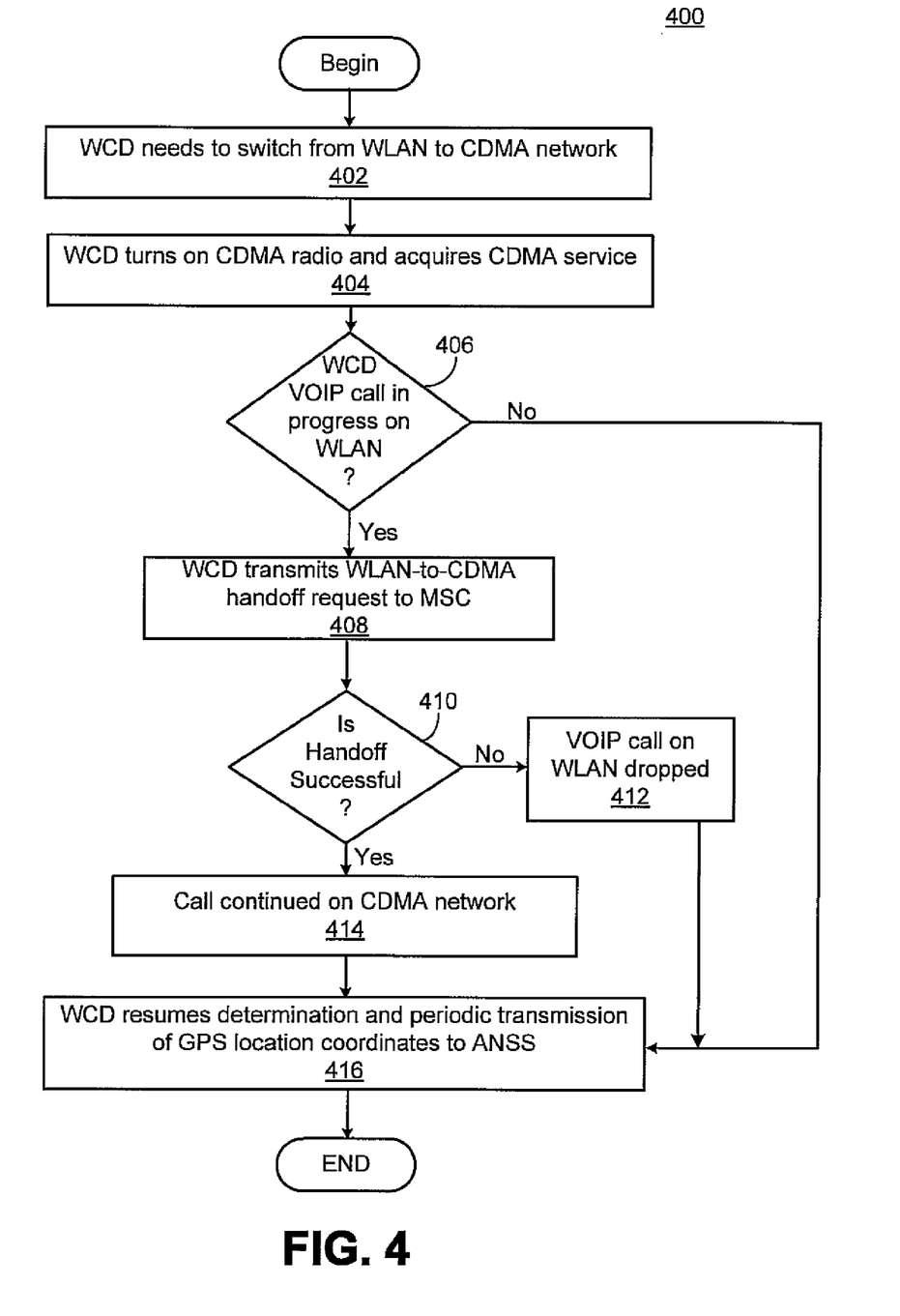
FIG. 4 is a flowchart illustrating an exemplary WLAN-to-CDMA handoff procedure.

FIG. 4 is a flowchart 400 illustrating an exemplary WLAN-to-CDMA handoff procedure. This procedure may be applied in the communication system 100 shown in FIG. 1. The GSM/GPRS WWAN 104 is a CDMA network.

In step 402, the WCD 102 detects one or more conditions that require it to switch from the WLAN 105 to the WWAN 104. Such a condition may arise when the WLAN radio signal, which the WCD 102 receives from the access point 116 is weak. In this circumstance, the WCD 102 needs to switch from the WLAN 105 to WWAN 104.

Upon detecting the need to switch networks, the WCD 102 turns on its WWAN radio (which was turned off when the WCD 102 was connected to the WLAN 105 to save power) and acquires the WWAN service (step 404).

The WCD 102 then determines whether there is a VOIP call in progress on the WLAN 105 (step 406). If there is no VOIP call in progress, the WCD 102 turns off its WLAN radio to save power, and resumes the periodic determination and transmission of GPS location coordinates to the ANSS 115 (step 416), and the process of FIG. 2 can be executed.

If the WCD user is in the middle of a VOIP call, the WCD 102 sends a request to the CDMA MSC 110 for handoff from WLAN 105 to the WWAN 104 (step 408).

If the handoff is successful and if the call is successfully handed off to the CDMA network (step 410), then the WCD user continues his/her call over the WWAN (step 414). However, if the handoff is unsuccessful, then the VOIP call is dropped (step 412). Once connected to the WWAN 104, the WCD 102 sends its location coordinates to the ANSS 115 periodically (step 416), and the process described by FIG. 2 can be executed by the system 100.

Figure 5:
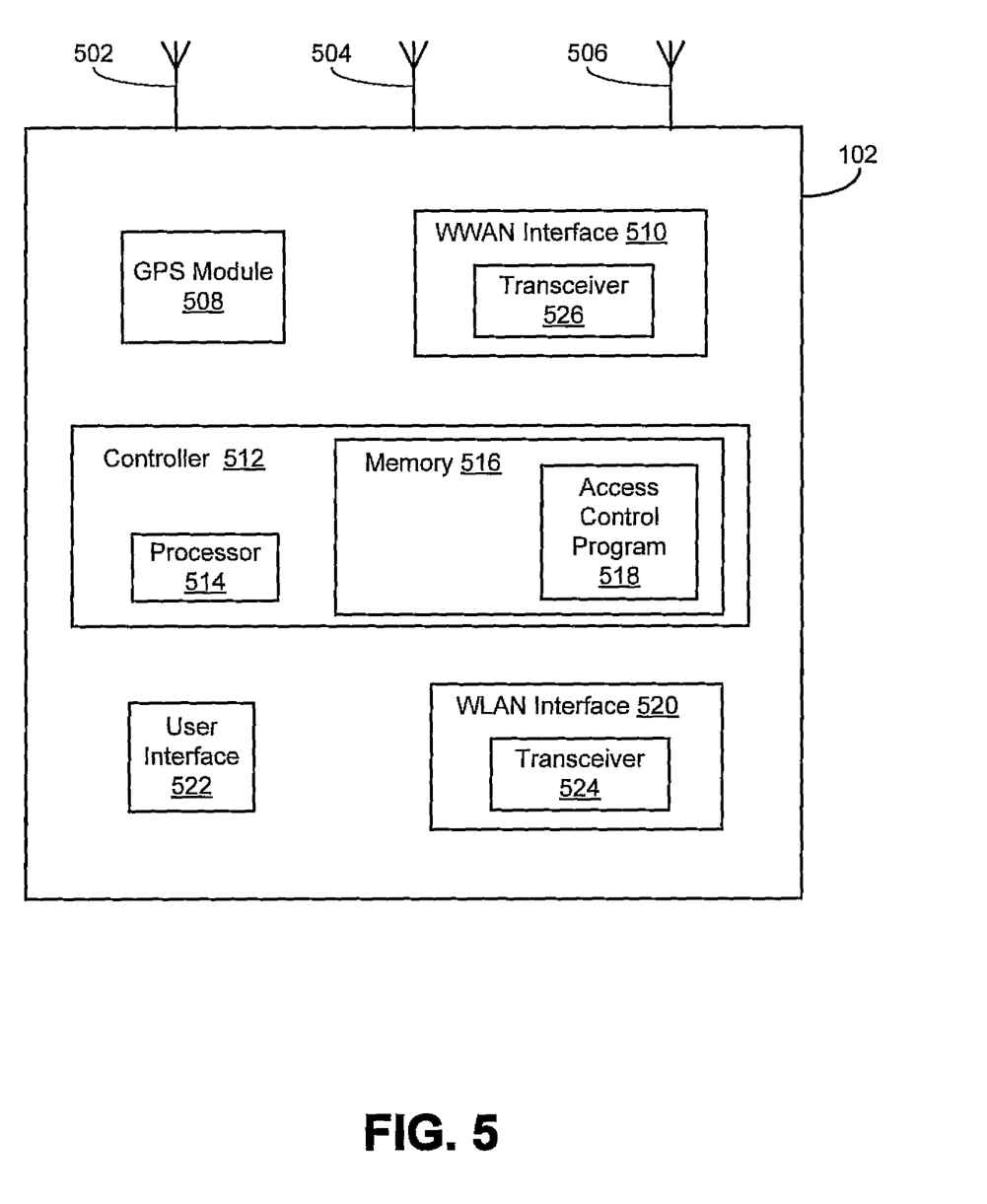
FIG. 5 is a block diagram illustrating certain components of the wireless communication device shown in FIG. 1.

FIG. 5 is a block diagram illustrating certain components of the WCD 102 shown in FIG. 1. The WCD 102 includes a wireless wide-area network (WWAN) interface 510, one or more antennas 502, 504, 506, a short-range WLAN interface 524, a controller 512 having a processor 514 and a memory 516 storing an access control program 518, a GPS module 508, and a user interface 522. The WCD 102 can include separate antennas 502-506 for communicating over the WLAN and WWAN links and with the GPS system, or alternatively, fewer or a single antenna may be used.

The WWAN interface 510 is a cellular network interface that comprises the entire physical interface necessary to communicate with the WWAN 104, including a wireless transceiver 526 configured to exchange wireless signals with the WWAN 104. The WWAN interface 510 exchanges wireless signals with the WWAN 104 to facilitate voice calls and data transfers over the WWAN 104 to a connected device. The connected device may be another WWAN terminal, a landline telephone, or network service entity such as a voice mail server, Internet server or the like.

The WLAN interface 520 comprises the entire physical interface and communication protocols necessary to wirelessly communicate with the WLAN 105, including a wireless transceiver 524 configured to exchange wireless signals between the WCD 102 and WLAN access point 116. The wireless link between the WCD 102 and access point 116 can be any suitable wireless technology, such as such as Wi-Fi (e.g., IEEE-802.11a/b/g/n) or Bluetooth. Where the link is Wi-Fi, the WLAN interface 520 can be configured to support VOIP and to use ad hoc, peer-to-peer connectivity.

The GPS module 508 may be a commercially-available GPS module that is interfaced with the controller 512 and other components, as needed, of the WCD 102.

The user interface 522 provides a means for a user to receive and enter visual and/or audio data and commands and the like during use of the WCD 102. The user interface 522 may include any suitable combination of one or more buttons, display screens, touch screens, microphones, speakers, switches and the like, such as those commonly found on conventional wireless handheld devices. The user interface 522 is controlled and monitored by the controller 209. The user interface 522 may include means for generating a user alert, such as a single tone audible beep, that can be output from the WCD 102 when the WCD 102 receives the list of WLAN access points, indicating that a WLAN access point is nearby and that the WCD 102 is turning on its Wi-Fi radio interface and start scanning for access points. The user interface 522 can also include visual displays indicating when the WCD 102 is connected to either the WWAN 104 or WLAN 105.

The controller 512 manipulates operations of the other components 508, 510, 520 and 522 of the WCD 102 and digitized information to ensure that the WCD 102 provides desired voice and data functions to the WCD user, as well as supports the access point detection, handoff and VOIP functionality disclosed herein. Although the controller 512 can be implemented using any suitable combination of hardware and software components, the controller 512 preferably comprises a processor-based architecture that includes the memory 516 for storing software and data and the processor 514 for executing the software and operating on data stored in the memory 516. Machine-readable data and executable instructions (also referred to as applications, software, firmware, code or program) are stored in the memory 512 and executed (or run) on the processor 514. All memory devices described herein, including memory 516, may comprise any suitable combination of volatile (e.g., random access memory) or non-volatile (e.g., read-only memory) storage known in the art. The processor 514 may comprise one or more microprocessors, microcontrollers, digital signal processors (DSPs), IP-cores, co-processors, similar devices or combinations thereof. Using known programming techniques, software stored in the memory 516 and executed by the processor causes the controller 512 to operate the WCD 102 to achieve the functionality described herein.

In addition to the access control program 518, the memory 516 may also store an operating system (OS) (not shown). The OS can be an off-the-shelf wireless device OS executable by the processor 514.

The access control program 518 is a software program running on the processor 514 that causes the WCD 102 to perform the WCD functions described herein and to operate in accordance with the methods described in connection with FIGS. 2-4. The access control program 518 can be written in Java, C, C++, or the like using conventional software development techniques.

The WWAN interface 510, WLAN interface 520, controller 512 can be implemented and integrated into a single component using an off-the-shelf mobile station modem (MSM) chipset.

Figure 6:
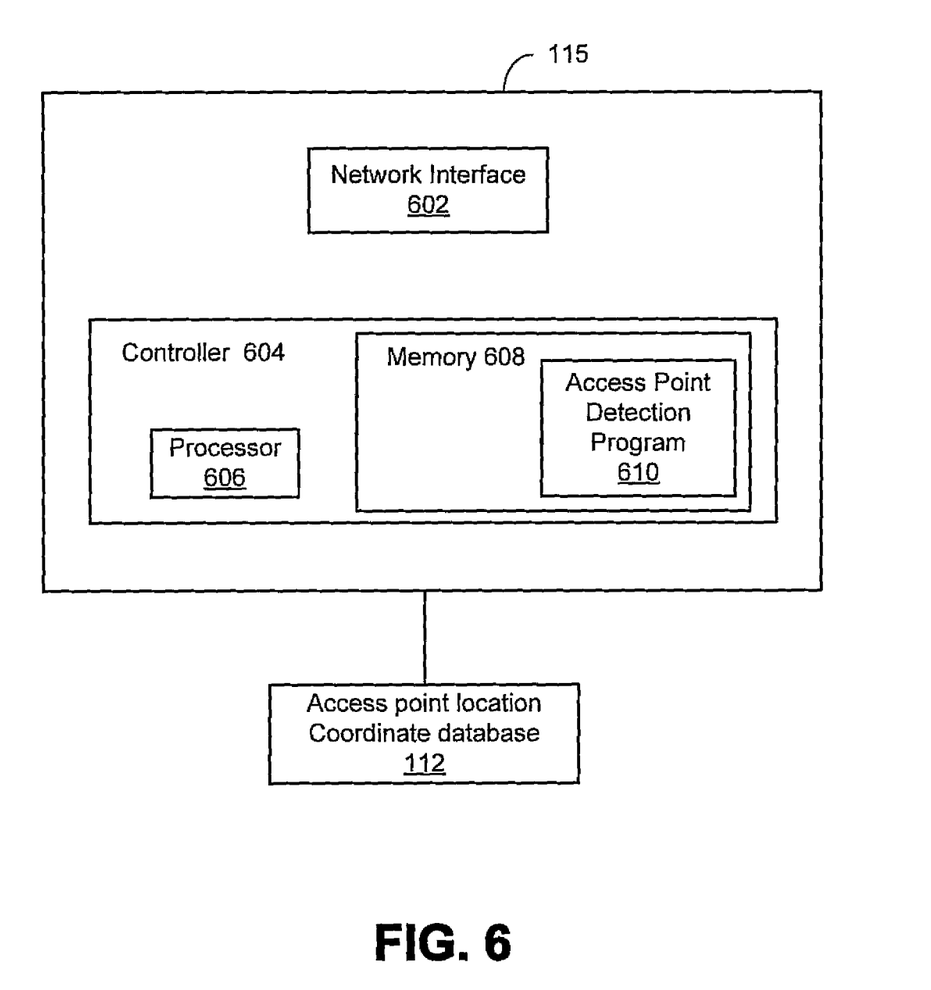
FIG. 6 is a block diagram illustrating certain components of an access network switching server included in the communication system shown in FIG. 1.

FIG. 6 is a block diagram illustrating certain components of the ANSS 115 included in the communication system 115 shown in FIG. 1. The ANSS 115 may be implemented using a networked server running a commercially-available server operating system and one or more applications for integrating it into the WWAN 104 and performing the ANSS functions described herein. Then ANSS 115 may include a network interface 602 and a controller 604 having at least one processor 606 and a memory 608.

The network interface 602 is configured to communicate with the MSC 110. The network interface 226 may include a commercially-available network interface card and software for data packet communications using conventional protocols such as TCP/IP, UDP/IP and/or HTTP.

Although the controller 604 can be implemented using any suitable combination of hardware and software components, the controller 604 preferably comprises a processor-based architecture that includes the memory 608 for storing software and data and the processor 606 for executing the software and operating on data stored in the memory 608. Machine-readable data and executable instructions (also referred to as applications, software, firmware, code or program) are stored in the memory 608 and executed (or run) on the processor 606. All memory devices described herein, including memory 608, may comprise any suitable combination of volatile (e.g., random access memory) or non-volatile (e.g., read-only memory) storage known in the art. The processor may comprise one or more microprocessors, microcontrollers, DSPs, IP-cores, co-processors, similar devices or combinations thereof. Using known programming techniques, software stored in the memory 608 causes the controller 604 to operate the ANSS 115 to achieve the functionality described herein.

The access point detection program 610 is a software application running on the ANSS 115 that causes the ANSS 115 to perform the ANSS functions described herein and to operate in accordance with the methods described in connection with FIGS. 2-4. The access point detection program 610 can be written using conventional software development techniques.

Other embodiments and modifications of this invention will occur readily to those of ordinary skill in the art in view of these teachings. For example, the comparison of the WCD location coordinates to the access point coordinate database and/or the determination of WCD immobility may occur, at least in part, within the WCD, instead to the ANSS. Thus, the above description is illustrative and not restrictive. This invention is to be limited only by the following claims, which include all such embodiments and modifications when viewed in conjunction with the above specification and accompanying drawings. The scope of the invention should, therefore, be determined with reference to the appended claims along with their full scope of equivalents.

What is claimed is:

1. A system, comprising:
a processor configured to compare the periodic wireless communication device (WCD) location coordinates updates to a database of wireless local area (WLAN) access point location coordinates to determine a list of access points within a vicinity of the WCD, and to send the list of access points to the WCD in response to determining that the WCD has remained within the vicinity for a preset monitoring time interval, the list of access points enabling the WCD to detect an access point.

2. The system of claim 1, comprising: a WCD having a GPS module configured to provide the periodic WCD location coordinate updates.

3. The system of claim 1, comprising:
a WCD having a WLAN interface and a wide area network (WWAN) interface, where the periodic WCD location coordinate updates are transmitted to a service provider via the WWAN interface.

4. The system of claim 3, wherein
the service provider maintains the database of wireless local area (WLAN) access point location coordinates on a server.

5. The system of claim 3, further comprising:
means for selectively activating the WLAN interface only when the WCD remains within the vicinity during the preset monitoring time interval.

6. The system of claim 1, wherein the processor is included in a mobile switching center.

7. The system of claim 1, comprising:
a WCD having a user interface configured to provide a notification when a WLAN access point is detected.

8. The system of claim 1, comprising: a WCD configured to connect to a WLAN after detecting a WLAN access point.

9. The system of claim 8, wherein the WCD is configured to disconnect from a wide area wireless network (WWAN) after connecting to the WLAN.

10. A method of detecting an access point, comprising:
receiving periodic location coordinate of updates from a wireless communication device (WCD);
determining a list of wireless local area (WLAN) access points within a vicinity of the WCD based on the periodic location coordinate updates;
determining that the WCD has remained within the vicinity for preset monitoring time interval based on the location coordinate updates; and
sending the list of access points to the WCD in response to determining that the WCD has remained within the vicinity for the preset monitoring time interval, the list of access points enabling the WCD to detect a WLAN access point.

11. The method of claim 10, wherein the step of determining a list of WLAN access points comprises:
comparing the location coordinate updates to a database of access point location coordinates.

12. The method of claim 10, wherein the step of receiving periodic location coordinate updates comprises:
  receiving a GPS coordinates from the WCD; and
  determining the vicinity based on the GPS coordinates.

13. The method of claim 10, comprising:
  activating a WLAN interface in the WCD to scan for an access point after determining that the WCD has remained within the vicinity for the preset monitoring time interval and after sending the list of access points to the WCD.

14. The method of claim 10, the step of receiving period location coordinate updates comprising:
  receiving the periodic location coordinate updates from a WWAN interface of the WCD.

15. A method of detecting an access point, comprising:
  transmitting location coordinate updates from a wireless communication device (WCD) via a wireless wide area network (WWAN) to a service provider;
  receiving, via the WWAN, a list of wireless local area network (WLAN) access points that are within a vicinity of the WCD based on a comparison of the location coordinate updates to a database of WLAN access point location coordinates and in response to the WCD-remaining within the vicinity for a preset monitoring time interval;
  activating a WLAN interface in response to the WCD remaining within the vicinity for the preset monitoring time interval; and
  scanning for WLAN access points using the list of WLAN access points.

16. The method of claim 15, wherein transmitting location coordinate updates comprises:
  transmitting GPS location coordinates.

17. The method of claim 15, further comprising:
  selecting a WLAN access point based on signal strength; and
  connecting to the WLAN though the selected WLAN access point.

18. The method of claim 17, further comprising:
  disconnecting from the WWAN after connecting to the WLAN.

19. The method of claim 18, further comprising:
  de-activating a WWAN interface included in the WCD.

* * * * *

UNITED STATES PATENT AND TRADEMARK OFFICE
CERTIFICATE OF CORRECTION

| | | |
|---|---|---|
| PATENT NO. | : 9,155,017 B2 | Page 1 of 1 |
| APPLICATION NO. | : 12/364975 | |
| DATED | : October 6, 2015 | |
| INVENTOR(S) | : Krishnanand Prabhu | |

It is certified that error appears in the above-identified patent and that said Letters Patent is hereby corrected as shown below:

In the claims

Column 10,
Line 14, delete "to compare the periodic wireless" and replace with -- to compare periodic wireless --

Column 10,
Line 15, delete "location coordinates" and replace with -- location coordinate --

Column 10,
Line 51, delete "coordinate of updates" and replace with -- coordinate updates --

Column 11,
Line 3, delete "receiving a GPS coordinates" and replace with -- receiving GPS coordinates --

Signed and Sealed this
Seventeenth Day of May, 2016

Michelle K. Lee
*Director of the United States Patent and Trademark Office*